United States Patent
Lee et al.

(10) Patent No.: US 8,130,694 B2
(45) Date of Patent: *Mar. 6, 2012

(54) METHOD FOR CONTROLLING TRANSMISSION POWER OF HS-SCCH IN UMTS SYSTEM

(75) Inventors: Young-Dae Lee, Kyungki-Do (KR); Bong-Hoe Kim, Kyungki-Do (KR); Seung-Hoon Hwang, Seoul (KR)

(73) Assignee: LG Electronics, Inc., Seoul (KR)

( * ) Notice: Subject to any disclaimer, the term of this patent is extended or adjusted under 35 U.S.C. 154(b) by 443 days.

This patent is subject to a terminal disclaimer.

(21) Appl. No.: 12/394,603

(22) Filed: Feb. 27, 2009

(65) Prior Publication Data

US 2009/0170549 A1 Jul. 2, 2009

Related U.S. Application Data

(63) Continuation of application No. 10/294,910, filed on Nov. 15, 2002, now Pat. No. 7,519,016.

(30) Foreign Application Priority Data

Nov. 16, 2001 (KR) .................................. 2001-71202

(51) Int. Cl.
*H04B 7/185* (2006.01)

(52) U.S. Cl. ........................................................ 370/318
(58) Field of Classification Search .................. 370/310, 370/328, 331, 342, 318, 338; 455/403, 422, 455/436–442, 522
See application file for complete search history.

(56) References Cited

U.S. PATENT DOCUMENTS

| | | | |
|---|---|---|---|
| 6,564,067 B1 | 5/2003 | Agin | |
| 6,567,670 B1 | 5/2003 | Petersson | |
| 6,594,499 B1 | 7/2003 | Andersson et al. | |
| 6,643,318 B1 | 11/2003 | Parsa et al. | |
| 6,650,905 B1 | 11/2003 | Toskala et al. | |
| 6,850,759 B2 | 2/2005 | Van Lieshout et al. | |
| 6,898,429 B1 | 5/2005 | Vialen et al. | |
| 6,934,556 B2 * | 8/2005 | Takano | 455/522 |
| 6,941,132 B2 | 9/2005 | Van Lieshout et al. | |
| 6,970,716 B2 * | 11/2005 | Rune et al. | 455/552.1 |
| 7,133,688 B2 * | 11/2006 | Das et al. | 455/522 |
| 7,292,854 B2 * | 11/2007 | Das et al. | 455/434 |

(Continued)

FOREIGN PATENT DOCUMENTS

EP 0 993 128 4/2000

(Continued)

OTHER PUBLICATIONS

European Office Action dated Oct. 18, 2006.

(Continued)

*Primary Examiner* — Dmitry H Levitan
(74) *Attorney, Agent, or Firm* — KED & Associates, LLP

(57) ABSTRACT

A method for controlling a power of a shared control channel for high speed downlink shared channel (HS-SCCH) in a system adopting a high speed downlink packet access (HS-DPA) technique is disclosed, which can control power of HS-SCCH by using the DPCH channel configured in each UE. Especially, by transmitting power of each sub-frame suitably for each UE, and by setting suitable transmission power of HS-SCCH according to whether it is in soft handover and according to whether it is a primary cell in soft handover, an inter-cell interference can be reduced and power of the base station can be effectively used.

5 Claims, 2 Drawing Sheets

U.S. PATENT DOCUMENTS

| | | | |
|---|---|---|---|
| 7,352,722 B2 * | 4/2008 | Malladi et al. | 370/335 |
| 7,496,374 B2 * | 2/2009 | Malkamaki | 455/522 |
| 2002/0003785 A1 | 1/2002 | Agin | |
| 2002/0077141 A1 | 6/2002 | Hwang et al. | |
| 2002/0115464 A1 | 8/2002 | Hwang et al. | |
| 2002/0172208 A1 | 11/2002 | Malkamaki | |
| 2002/0183075 A1 | 12/2002 | Fauconnier | |
| 2005/0063347 A1 | 3/2005 | Sarkkinen et al. | |
| 2005/0208961 A1 | 9/2005 | Willnegger | |

FOREIGN PATENT DOCUMENTS

| | | |
|---|---|---|
| EP | 1 059 736 | 12/2000 |
| EP | 1 089 458 | 4/2001 |
| EP | 1 313 231 | 5/2003 |
| EP | 1 313 334 | 5/2003 |
| KR | 10-2002-0029143 | 4/2002 |
| KR | 10-2002-0036639 | 5/2002 |
| KR | 10-2002-0038823 | 5/2002 |
| KR | 10-2002-0060900 | 7/2002 |
| WO | WO 00/55976 | 9/2000 |

OTHER PUBLICATIONS

European Search Report dated Jun. 21, 2004.
PCT Search Report dated Mar. 10, 2003.
LG Electronics Inc., "Text Proposal for TR 25.841: Improvement of Power Control for DSCH in Soft Handover"; 3GPP TSG RAN WG 1#18; Boston, MA; Jan. 15-18, 2001; TSG R1-01-0063, pp. 1-9.
3GPP TS 25.214 v3.8.0 (Sep. 2001); Technical Specification; $3^{rd}$ Generation Partnership Project; Technical Specification Group Radio Access Network; Physical Layer Procedures (FDD) (Release 1999); pp. 11-27.
LG Electronics Inc.; "HS-PSHCCH Power Control"; TSG-RAN Working Group 1 Meeting #22; Jeju, Korea; Nov. 19-23, 2001; R1-01-1249.
Siemes AG; "Power Control Options for TDD HSDPA"; TSG-RAN WG 1 Adhoc on HSDPA; Sophia Antipolis, France; Nov. 7-9, 2001; R1-01-1053.
Japanese Notice of Allowance dated Dec. 10, 2008.
Motorola "Control Channel Structure for High Speed DSCH (HS-DSCH)" TSGR1/R2-12A010021, Apr. 5, 2001, pp. 1-5.
Lucent Technologies: "Text Proposal for the HSDPA Technical Report" TSGR1#17(00)1384; Nov. 21, 2000 XP002175651 retrieved from the Internet; http://www.3gpp.org/ftp/tsg_ran/WG1_R; paragraph 6.7.2.
European Search Report dated Mar. 20, 2003.
European Patent Office communication for Application 02 025 343.1 dated Aug. 25, 2010.
Siemens; "Structure of the downlink shared control channel for HSDPA;" TSG-RAN Working Group 1 Ad Hoc meeting on HSDPA, Nov. 5-7, 2001, Sophia Antipolis, France.
ITU Ad Hoc; Material to be submitted to ITU-R WP8F#5, (Stockholm, Jun. 27-Jul. 3, 2001) toward Revision 1 of Recommendation ITU-R M.1457.

* cited by examiner

METHOD FOR CONTROLLING TRANSMISSION POWER OF HS-SCCH IN UMTS SYSTEM

This application is a Continuation Application of U.S. application Ser. No. 10/294,910, filed Nov. 15, 2002 now U.S. Pat. No. 7,519,016, which claims priority from Korean Application No. 71202/2001, filed Nov. 16, 2001, the subject matters of which are incorporated herein by reference.

BACKGROUND OF THE INVENTION

1. Field of the Invention

The present invention relates to a 3GPP UMTS system and, more particularly, to a method for controlling a power of a shared control channel for high speed downlink shared channel (HS-SCCH) in a system adopting a high speed downlink packet access (HSDPA) technique.

2. Description of the Background Art

In general, a standard system of a third generation partnership project (3GPP) proposes a new high speed downlink shared channel (HS-DSCH) in order to support a high speed packet data service. The HS-DSCH is used in a UMTS system for Release 5 which specifies a high speed downlink packet access (HSDPA).

Unlike a W-CDMA system in 3GPP technical specifications for Release 99/Release 4, the HS-DSCH uses a short transmission time interval (TTI) (3 slot, 2 ms) and supports diverse modulation code sets (MCS) in order to support a high data rate.

Thus, an optimal data transmission performance can be improved by selecting the most suitable MCS for a radio channel condition, for which a hybrid ARQ (HARQ) technique is adopted which combines an automatic repeat request (ARQ) technique and a channel coding technique.

The HS-DSCH transmits high speed user data to different users for every sub-frame of 2 msec. Accordingly, in order for a terminal to receive the user data over the HS-DSCH, a shared control channel for HS-DSCH (HS-SCCH) and a dedicated physical channel (DPCH) should be configured.

The HS-SCCH, a physical channel, is a type of a downlink common control channel for supporting the HSDPA technique. The channel is used to transmit a UE ID (User Equipment Identification) and control information, whereby the terminal can receive the HS-DSCH transmitting the high speed user data. The terminal monitors the UE ID transmitted over the HS-SCCH to recognize whether there is data the terminal is to receive, and then, if there is data the terminal is to receive, receives the user data transmitted over the HS-DSCH by using the control information received from the HS-SCCH. Furthermore, the UE ID and the control information are transmitted for every sub-frame (2 ms) of the HS-SCCH. A Node B (a base station) to which a cell transmitting the HS-DSCH belongs generates the control information transmitted over the HS-SCCH.

FIG. 1 is a structure of a sub-frame of the control information transmitted over the HS-SCCH.

As shown in FIG. 1, the control information is roughly classified into transport format and resource related information (TFRI) and HARQ related information. The TFRI includes information related to a transport channel set size, modulation, a coding rate and the number of multicodes for HS-DSCH, and the HARQ related information includes information such as a block number and a redundancy version. Besides, UE ID is transmitted over HS-SCCH.

FIG. 3 is a drawing illustrating a transmission timing of the HS-SCCH and the HS-DSCH.

As shown in FIG. 3, after the UE ID and the control information are transmitted over the HS-SCCH, a data is transmitted over the HS-DSCH.

One or more HS-SCCHs are configured in one cell. In particular, if there are many UEs supporting the HSDPA technique in a cell, multiple HS-SCCH channels should be configured in one cell so as to efficiently provide data services.

In the conventional techniques, the common control channel is transmitted with a power level so high as to be received at a cell boundary.

However, in the case that the HS-SCCH is transmitted with such a high power as in the conventional techniques, an inter-cell interference is increased, and since a large amount of the Node B power (base station power) should be assigned for the transmission of the HS-SCCH, the Node B power is wasted The above references are incorporated by reference herein where appropriate for appropriate teachings of additional or alternative details, features and/or technical background.

SUMMARY OF THE INVENTION

Therefore, an object of the present invention is to provide a method for controlling a transmission power of a control channel for a channel shared by plural users, which is shared with timeslot by plural users.

More preferably, the object of the present invention is to provide a method for setting transmission power of the timeslot of the control channel in relation to the transmission power of a channel dedicated to a user that uses the timeslot. Wherein, the control channel may be HS-SCCH and the channel shared by plural users may be HS-DSCH and the channel dedicated to a user may be DL DPCH of an UMTS system.

Another object of the present invention is to provide a method for controlling a transmission power of an HS-SCCH that is capable of controlling a power of an HS-SCCH by using a downlink DPCH channel configured for every user equipment.

Still another object of the present invention is to provide a method for controlling a transmission power of an HS-SCCH that is capable of reducing an inter-cell interference and effectively using power of a base station by transmitting transmission power of each sub-frame of HS-SCCH suitable for each terminal.

To achieve at least the above objects in whole or in parts, there is provided a method for controlling a transmission power of an HS-SCCH including the steps of: receiving a transmit power control (TPC) command from a mobile station; determining transmission power of a downlink dedicated physical channel (DL DPCH) based on the received TPC command; and determining transmission power of a shared control channel for HS-DSCH (HS-SCCH) transmitted to each mobile station by using a power offset value related to transmission power of the DL DPCH.

Preferably, the transmission power for a sub-frame of HS-SCCH is offset relative to the transmission power for a field of DL DPCH.

In addition, the transmission power for a slot in a sub-frame of HS-SCCH is offset relative to the transmission power for a corresponding slot of DL DPCH.

Preferably, different power offset is applied to transmission power of HS-SCCH according to whether UE is in soft handover or not.

Preferably, different power offset is applied to transmission power of HS-SCCH according to whether UE is in soft handover or not, and if the UE is in soft handover, according to whether the cell transmitting the HS-SCCH is primary or not.

Preferably, transmission power of the HS-SCCH is determined by a relative power offset value of one field power among a data field, a TFCI field, a TPC field and a pilot field of DL DPCH.

To achieve at least these advantages in whole or in parts, there is further provided a method for controlling transmission power of an HS-DSCH in the HSDPA system where mobile stations receive control information transmitted over HS-SCCH by node B and then receive user data transmitted over HS-DSCH using the control information, wherein the transmission power of HS-SCCH is adjusted to power level required for each mobile station, based on the power control of DL DPCH configured for each mobile station.

Preferably, transmission power of HS-SCCH is determined by a power offset relative to the transmission power of the DL DPCH for specific user equipment, and transmission power of each sub-frame of HS-SCCH is determined by a power offset value for each field power of DL DPCH.

Preferably, a radio network controller (RNC) sends the power offset value to the Node B, and the Node B determines the transmission power of the HS-SCCH using the received power offset value.

Preferably, transmission power of the HS-SCCH is determined by using different power offset values according to whether a corresponding UE is in soft handover of its DL DPCH.

Preferably, the radio network controller (RNC) sends the different power offset values to the Node B, and the Node B determines the transmission power of HS-SCCH by selecting one of those power offset values according to whether the UE is in soft handover.

Preferably, a different power offset is applied to transmission power of the HS-SCCH according to whether UE of a specific terminal is in soft handover or not and according to whether a cell transmitting HS-SCCH is primary or not.

Preferably, the power offset values includes: a first power offset value for a case that UE is not in soft handover; a second power offset value for a case that UE is in soft handover and a base station cell is primary; and a third power offset value for a case that UE is in soft handover and a base station cell is non-primary.

Preferably, the RNC sends the power offset values to the Node B (base station), and the Node B determines the transmission power of the HS-SCCH by selecting one of power offset values according to whether the UE is in soft handover and the cell transmitting HS-SSCH is primary.

Preferably, the transmission power of HS-SCCH s determined by a power offset value of one of a data field, a TFCI field, a TPC field and a pilot field of the DL DPCH.

Preferably, the power offset values includes: a first power offset value for a case that UE is not in soft handover; a second power offset value for a case that UE is in soft handover and a base station cell is primary; and a third power offset value for a case that UE is in soft handover and a base station cell is non-primary.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Figure 1:
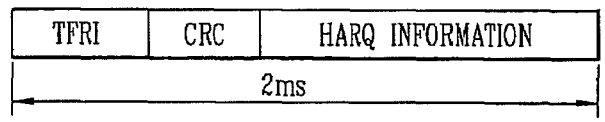
FIG. 1 is a drawing illustrating a structure of control information transmitted over HS-SCCH.
Figure 2:
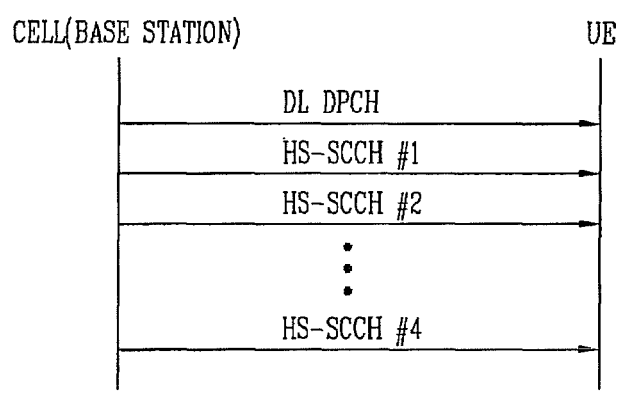
FIG. 2 is a drawing illustrating signaling of HS-SCCH for transmitting the control information.
Figure 3:
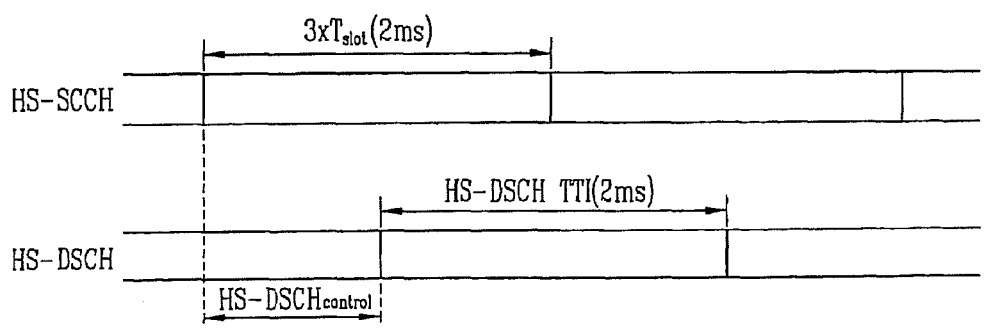
FIG. 3 is a drawing illustrating transmission timing of HS-SCCH and HS-DSCH.
Figure 4:
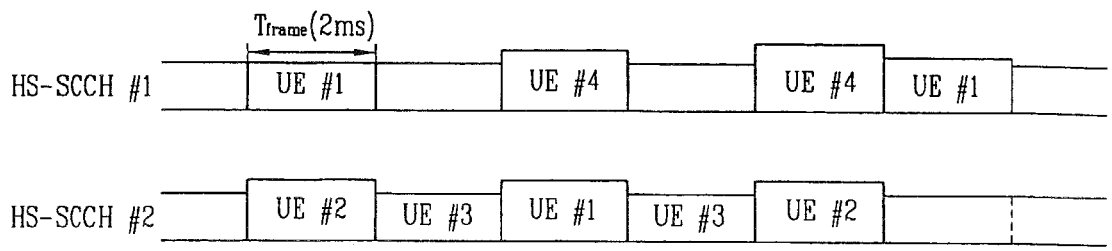
FIG. 4 is a drawing illustrating a power determining method of HS-SCCH in accordance with the present invention.

In general, HS-SCCH is divided into a plurality of sub-frames ($T_{frame}$-2 ms), and each sub-frame transmits control information dedicated to specific UE. Using such characteristics, in the present invention, as shown in FIG. 4, unlike a general common control channel, each sub-frame of HS-SCCH is transmitted with required power for each UE (UE#1-UE#4).

For this purpose, in the present invention, the power control of HS-SCCH is performed by using the power control of DPCH for each UE. That is, according to the power control of downlink (DL) and uplink DPCH, the transmission power of HS-SCCH can be adjusted. In detail, it is constructed such that the transmission power of HS-SCCH is operated by a power offset related to the transmission power of DL DPCH.

The DL DPCH consists of a data field, a TFCI field, a TPC field and a pilot field. Thus, slot transmission power of a specific sub-frame of HS-SCCH can be determined by a power offset for transmission power of one of the DL DPCH fields.

Figure 5:
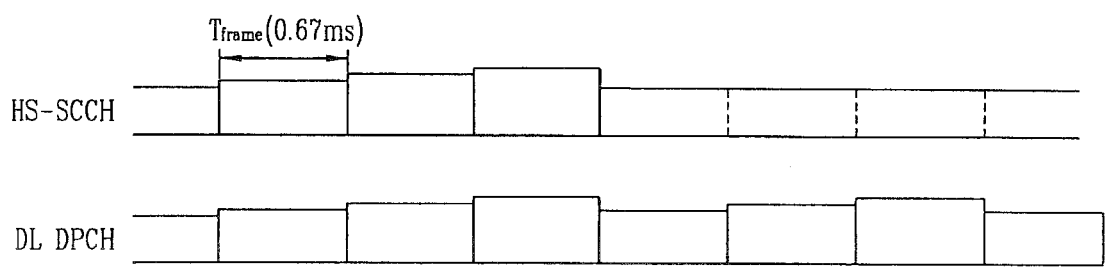
FIG. 5 is a drawing illustrating determining a relative power transmission of HS-SCCH to a DL DPCH of FIG. 4.

FIG. 5 is a drawing illustrating a method of determining transmission power of HS-SCCH for the downlink DPCH in accordance with one embodiment of the present invention.

As shown in FIG. 5, the transmission power for each slot in a sub-frame of HS-SCCH is offset relative to the transmission power for one field of the corresponding slot of DL DPCH. Since the DL DPCH changes the transmission power for every one slot according to a power control command transmitted from the UE, resultantly, the transmission power of each slot of HS-SCCH is also changed to transmission power suitable to each UE. Therefore, it can be said that the power transmission of HS-SCCH is controlled by the TPC command transmitted for the power control of DL DPCH from the UE.

Figure 6:
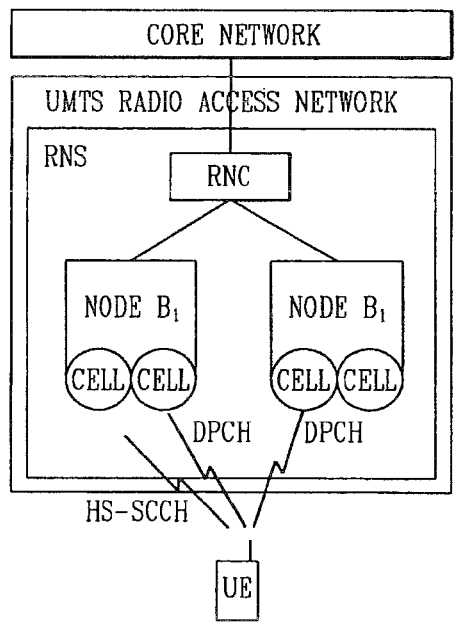
FIG. 6 is a drawing illustrating determining power transmission of HS-SCCH in soft handover in a radio access network structure.

FIG. 6 is a drawing illustrating a structure of a radio access network in soft handover between Nodes B in the RNC.

As shown in FIG. 6, the RNC existing in the UMTS radio access network manages dedicated radio resources allocated to each mobile station (UE) in the radio network subsystem (RNS).

If the mobile station (UE) is moved from a first base station (Node B1) to a second base station (Node B2) in the RNC, first and second base stations (Node B1 and Node B2), respectively, demodulate signals received from the UE and send demodulated DPCH frames to the RNC. Then, the RNC selects the best one from the received frames. In this manner, the mobile station can continuously maintain the DPCH channel by communicating with the two base stations (Node B1 and Node B2) simultaneously.

In the radio access network structure as shown in FIG. 6, the DL DPCH is transmitted in different two cells, and HS- SCCH is transmitted only in a cell belonging to the first base station (Node 1). Thus, in case of occurrence of a soft handover, operation of the HS-SCCH power control should be taken into account.

That is, as shown in FIG. 6, if DPCH of the UE is in soft handover, power control of associated DL DPCHs is performed in consideration of combining at the UE. In this respect, however, when the DL DPCH is in soft handover, HS-SCCH is not possibly in soft handover, this situation needs to be considered in determining the transmission power.

Therefore, in order to prevent an increase in an error rate of HS-SCCH that can possibly occur in the soft handover of DL DPCH, the transmission power of HS-SCCH should be increased.

A method for controlling transmission power for HS-SCCH in the soft handover of DL DPCH will now be described.

In the present invention, when determining the power offset of HS-SCCH, different power offset values are used according to whether DL DPCH is in soft handover or not.

For this purpose, the RNC should send a power offset value (POshcch_normal) for the case of not being in a soft handover and a power offset value (POshcch_sho) for the case of being in a soft handover to the Node B (Node B1 in FIG. 6) over an Iub (interface between the control station and base station).

Thereafter, the Node B determines the transmission power of HS-SCCH by using one of the two power offset values according to whether the DL DPCH is in soft handover.

In general, in order to minimize occurrence of interference due to the DPCH transmitted from a plurality of cells in the soft handover, a 3GPP WCDMA uses a site selection diversity transmit (SSDT) technique.

With the SSDT technique, in the soft handover, the UE selects a cell with the highest received signal power code (RSCP) value of a common pilot channel (CPICH) among active cells as a primary cell, designates remaining cells as non-primary cells, and transmits an ID of the primary cell to the active cells.

And then, the primary cell transmits the DPCH data, while the non-primary cells temporarily suspends transmission of DPCH data. The UE periodically measure the RSCP of the CPICH and periodically transmits an SSDT ID of the primary cell to every active cell. At this time, the UE transmits the primary cell ID over a feedback information (FBI) field of DPCCH.

Thus, in the present invention, whether a cell transmitting HS-SCCH is primary or non-primary, as well as whether the UE is in soft handover, is considered by utilizing the SSDT method. Irrespective of whether the DPCH is operated by SSDT, this method uses only an uplink signaling over the FBI field used in the SSDT.

For this purpose, the RNC should send a power offset value (POshcch_normal) for the case of not being in soft handover, a power offset value (POshcch_primary) for the case of being primary cell in soft handover, and a power offset value (POshcch_nonparimary) for the case of being non-primary cell in soft handover to the corresponding Node B (Node B1 in FIG. 6) on the Iub.

Thereafter, by using the SSDT cell ID transmitted by the UE, the Node B selects one of the three power offset values according to whether the UE is in soft handover and according to whether the cell is primary in soft handover, to determine the transmission power of HS-SCCH.

As aforementioned, the DL DPCH consists of the data field, the TFCI field, the TPC field and the pilot field, and the transmission power of HS-SCCH is determined by a power offset for transmission power of one of those fields.

In the above descriptions, the terminal, the mobile station and the UE are used with the same meaning.

As so far described, the method for controlling transmission power of HS-SCCH of the present invention can control power of HS-SCCH by using the DPCH channel configured in each UE.

Especially, by transmitting power of each sub-frame suitably for each UE, and by setting suitable transmission power of HS-SCCH according to whether it is in soft handover and according to whether it is a primary cell in soft handover, an inter-cell interference can be reduced and power of the base station can be effectively used.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A control information processing method for a communications system, the method comprising:
   receiving, by a base station (Node B), a power offset (PO) value from a radio network controller (RNC) that supports high speed downlink packet access (HSDPA),
   wherein the PO value is for a first high speed shared channel related to a second high-speed shared channel, and the receiving is performed via an interface between the base station and the RNC,
   wherein the first high speed shared channel is a high speed shared control channel (HS-SCCH) and the second high speed shared channel is a high speed downlink shared channel (HS-DSCH),
   wherein the first high speed shared channel is a control channel for the second high speed shared channel,
   wherein the HS-SCCH comprises a 2 ms sub-frame containing 3 slots, and
   wherein the interface is an Iub interface between the RNC and the base station used for providing the PO value; and
   determining a transmission power of the HS-SCCH using the received PO value,
   wherein the received PO value is relative to at least one field of a downlink dedicated physical channel (DL DPCH).

2. The method of claim 1, wherein the at least one field of the DL DPCH comprises at least one of a data field, a Transport Format Combination Indicator (TFCI) field, a TPC (Transmit Power Control) field or a pilot field.

3. The method of claim 1, wherein a different power offset is applied according to whether a user equipment (UE) is in soft handover or not.

4. The method of claim 1, wherein a different power offset is applied whether or not a cell that transmits the first high speed shared channel is a primary cell with respect to a user equipment (UE).

5. The method of claim 1, wherein the PO value comprises:
   a first power offset value for a case that a user equipment (UE) is not in soft handover;
   a second power offset value for a case that the UE is in soft handover and the cell is primary; and
   a third power offset value for a case that the UE is in soft handover and the cell is non-primary.

* * * * *